United States Patent [19]

Maeyama

[11] Patent Number: 5,729,273
[45] Date of Patent: Mar. 17, 1998

[54] COLOR VIDEO PRINTER

[75] Inventor: Sadao Maeyama, Chiba, Japan

[73] Assignee: Sony Corporation, Tokyo, Japan

[21] Appl. No.: 397,650

[22] Filed: Mar. 2, 1995

[30] Foreign Application Priority Data

Mar. 8, 1994 [JP] Japan ..................... 6-037301

[51] Int. Cl.[6] ..................... B41J 2/325
[52] U.S. Cl. ..................... 347/172
[58] Field of Search ..................... 347/171, 172; 400/120.01, 120.02

[56] References Cited

U.S. PATENT DOCUMENTS 4,843,426  6/1989  Levine .
4,998,165  3/1991  Lindstrom .

*Primary Examiner*—Huan H. Tran
*Attorney, Agent, or Firm*—Jay H. Maioli

[57] ABSTRACT

A video printing apparatus includes a trigger signal generator for generating a first trigger signal and a second trigger signal having a timing different from that of the first trigger signal, a first memory for storing an input video signal in response to the first trigger signal supplied thereto, a second memory for storing an input video signal in response to the second trigger signal supplied thereto, and a printing device for printing an image of a first color based on the video signal stored in the first memory and printing an image of a second color different from the first color based on the video signal stored in the second memory.

4 Claims, 5 Drawing Sheets

COLOR VIDEO PRINTER

BACKGROUND OF THE INVENTION

The present invention relates to an apparatus for outputting a monochrome (black and white) video signal as a color image and, more particularly, to a color video printer for printing a monochrome video signal as a color image and a method for outputting a monochrome video signal as a color image.

A monochrome video signal is output from monochrome output apparatus, such as a black and white television receiver, a display device, a printer or the like, as a monochrome image. On the other hand, a color video signal is output from color output apparatus, such as a color television receiver, a display device, a printer or the like, as a color image. It has never been proposed to output a monochrome video signal as a color image until now.

If, however, a monochrome video signal is output as a color image, there are then the advantages in some specified uses. For example, if images indicating states at two different time points of monochrome video signals obtained after an object changing with time has been continuously photographed are output as images of different colors, such as red and blue, then it becomes possible to well understand the states that the object changes with time.

SUMMARY OF THE INVENTION

It is therefore an object of the present invention to provide a color video printer in which monochrome video signals representing states of arbitrary different timings can be output as an color image.

It is another object of the present invention to provide a video printer in which a monochrome video signal can be output as a color image without modifying commercially-available apparatus and devices greatly.

According to a first aspect of the present invention, there is provided a video printing apparatus which is comprised of a trigger signal generator for generating a first trigger signal and a second trigger signal having a timing different from that of the first trigger signal, a first memory for storing an input video signal in response to the first trigger signal supplied thereto, a second memory for storing an input video signal in response to the second trigger signal supplied thereto, and a printing device for printing an image of a first color based on the video signal stored in the first memory and printing an image of a second color different from the first color based on the video signal stored in the second memory.

According to a second aspect of the present invention, there is provided a video printing apparatus which is comprised of first and second input terminals to which video signals are supplied respectively, first and second memories for storing the video signals in response to trigger signals supplied thereto, a distributor for supplying the video signal supplied thereto from the first input terminal to the first memory and the video signal supplied thereto from the second input terminal to the second memory in a first mode and supplying the video signal supplied thereto from one of the first and second input terminals to the first and second memories in a second mode, a timing generator for supplying the trigger signals to the first and second memories simultaneously in the first mode and supplying the trigger signals to the first and second memories at arbitrary timings in the second mode, and a printing device for printing an image of a first color based on the video signal stored in the first memory and printing an image of a second color based on the video signal stored in the second memory.

In accordance with a third aspect of the present invention, there is provided a method for printing a color image from a monochrome video signal which comprises the steps of inputting the monochrome video signal, storing the monochrome video signal in a first memory in response to a first trigger signal supplied thereto, storing the monochrome video signal in a second memory in response to a second trigger signal supplied thereto, printing the video signal stored in the first memory on a printing paper in a first color and printing the video signal stored in the second memory on the printing paper in a second color different from the first color.

DETAILED DESCRIPTION OF THE PREFERRED EMBODIMENT

The present invention will now be described with reference to the drawings.

Figure 1:
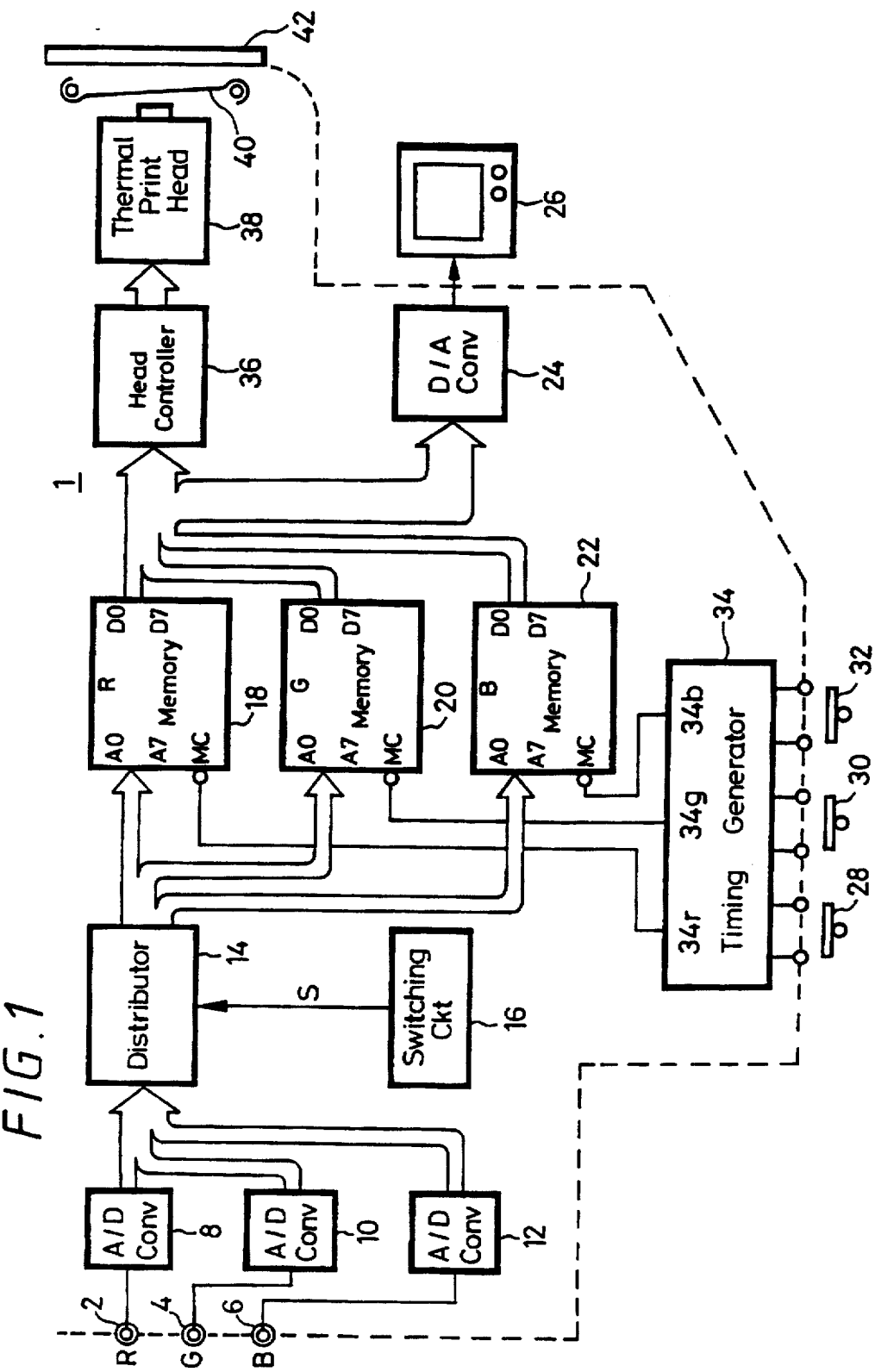
FIG. 1 is a block diagram showing an overall arrangement of a video printer according to the present invention.

FIG. 1 of the accompanying drawings shows an overall arrangement of a video printing apparatus 1 which can output a monochrome video signal as a color image according to an embodiment of the present invention. The video printing apparatus 1 is substantially the same as a commercially-available color thermal transfer printer excepting a slight modification.

To understand the present invention more clearly, this commercially-available color thermal transfer printer will be described in brief.

This color thermal transfer printer does not include a distributor 14 unlike the video printing apparatus 1 shown in FIG. 1. Further, although the video printing apparatus 1 according to the present invention includes three switches 28, 30 and 32, the commercially-available color thermal transfer printer includes one switch so that depression of one switch of the commercially-available color thermal transfer printer corresponds to three simultaneous depressions of the three switches 28 to 32 shown in FIG. 1.

The color thermal transfer printer includes R, G, B input terminals 2, 4 and 6. Analog color signals R1 (red), G1 (green) and B1 (blue) which are component signals of analog color video signal are supplied to the R, G, B input terminals 2, 4 and 6, respectively. These analog color signals R1, G1 and B1 are supplied to and converted by analog-to-digital (A/D) converters 8, 10 and 12, to 8-bit digital color signals R2, G2 and B2, respectively. If digital color video signals are supplied to the R, G, B input terminals 2, 4 and 6, then the A/D converters 8, 10 and 12 are not needed.

Since the commercially-available thermal transfer printer is not provided with the distributor 14 as described above, the digital color signals R2, G2 and B2 are supplied to data input terminals A0 to A7 of an R memory 18, a G memory 20 and a B memory 22. Each of the R memory 18, the G memory 20 and the B memory 22 is a frame memory capable of storing digital color signals of one picture amount. The R memory 18, the G memory 20 and the B memory 22 might be static RAMs (random access memories). One picture is generally composed of a digital color signal of 2 fields, that is, a digital color signal of one frame. In this case, one picture might be composed of a digital color signal of one field.

When the digital color signals are stored, if timing signals are not supplied to memory control terminals MC of the R memory 18, the G memory 20 and the B memory 22, then the digital color signals R2, G2 and B2 are not stored in the R memory 18, the G memory 20 and the B memory 22 and are output from data output terminals D0 to D7 as they are. The digital color signals R2, G2 and B2 are supplied to and converted by a digital-to-analog (D/A) converter 24 to analog color signals. The analog color signals from the A/D converter 24 are supplied to an external display device 26 and thereby displayed as a color image.

In this state, when a desired color image is displayed on the display device 26, the operator depresses the fetch switches 28, 30 and 32. Incidentally, the commercially-available color thermal transfer printer includes only one switch unlike FIG. 1 as described above. When this switch is depressed (this depression corresponds the three simultaneous depressions of the three switches 28, 30 and 32 shown in FIG. 1), a timing generator 34 generates fetch trigger signals from output terminals 34r, 34g and 34b simultaneously. The R memory 18, the G memory 20 and the B memory 22 store the digital color signals R2, G2 and B2 of one picture amount in response to the fetch trigger signals supplied to the memory control terminals MC thereof.

Specifically, when the fetch trigger signals are supplied to the memory control terminals MC of the R memory 18, the G memory 20 and the B memory 22, the digital color signals R2, G2 and B2 of one picture amount are stored in the R memory 18, the G memory 20 and the B memory 22, respectively. When the fetch trigger signals are not supplied to the memory control terminals MC of the R memory 18, the G memory 20 and the B memory 22, the digital color signals R2, G2 and B2 are directly supplied to the D/A converter 24, in which they are converted to analog color signals and then displayed by the display device 26 as a color image based on the digital color signals R2, G2 and B2.

Subsequently, upon printing, the digital color signals R2, G2 and B2 of one picture amount stored in the R memory 18, the G memory 20 and the B memory 22 are respectively output from the data output terminals D0 to D7 as digital color signals R2, G2 and B2 and supplied to a head controller 36. The head controller 36 includes a matrix circuit and a thermal print head driver, though not shown. The matrix circuit transforms the digital color signals R2, G2 and B2 to a digital color signal Y, a digital color signal M and a digital color signal C, each of which is suitable for use in printing. The thermal print head driver drives the thermal print head 38 based on the digital color signals Y, M and C obtained from the matrix circuit. Therefore, upon printing, a yellow image is printed using a yellow ink ribbon for the digital color signal Y, a magenta image is printed using a magenta ink ribbon for the digital color signal M and a cyan image is printed using a cyan ink ribbon for the digital color signal C. Then, the yellow, magenta and cyan images thus printed are synthesized to print out a color image.

Alternatively, it is possible to display image data stored in the R memory 18, the G memory 20 and the B memory 22 on the display device 26 as a still picture.

The video printing apparatus 1 capable of outputting a monochrome video signal as a color image according to the present invention will now be described.

As shown in FIG. 1, the video printing apparatus 1 according to the present invention is modified and different from the commercially-available color thermal transfer printer only in that the video printing apparatus 1 includes the distributor 14 and the three switches 28, 30 and 32 for the timing generator 34 to thereby separately supply the fetch trigger signals to the R memory 18, the G memory 20 and the B memory 22. A rest of the arrangement of the video printing apparatus 1 according to the present invention is similar to that of the commercially-available color thermal transfer printer.

The present invention relates to the video printing apparatus 1 which can output a monochrome video signal as a color image. Accordingly, an analog monochrome video signal B & W1 is supplied to any one of the R, G, B input terminals 2, 4, 6 of the video printing apparatus 1 shown in FIG. 1, preferably, the G input terminal 4. The reason for this is that a signal input from the G input terminal 4 is processed in a synchronizing signal fashion so that a monochrome video signal is input to the G input terminal 4.

The monochrome video signal B & W1 is converted to a digitized monochrome video signal B & W2 by the A/D converter 10 and supplied to the distributor 14.

Figure 2:
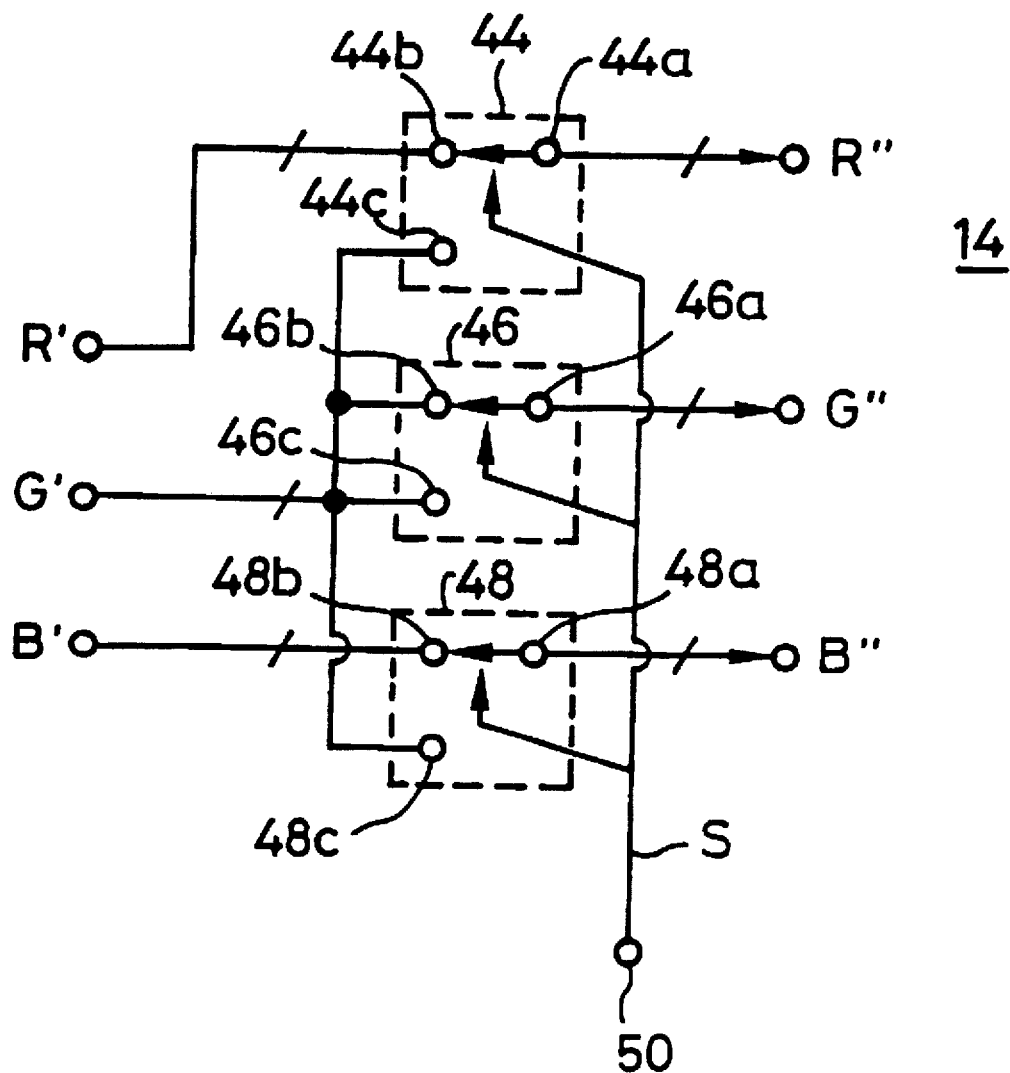
FIG. 2 is a block diagram showing more fully a distributor shown in FIG. 1.

Action of the distributor 14 will be described with reference to FIG. 2. As shown in FIG. 2, in the distributor 14, an input terminal R' is connected to a fixed input terminal 44b of a multiplexer 44 that serves as a selector. An input terminal G' is connected to a fixed input terminal 46b of a multiplexer 46 which serves as a selector and fixed input terminals 44c, 46c and 48c of three multiplexers 44, 46 and 48. An input terminal B' is connected to a fixed input terminal 48b of the multiplexer 48 that serves as a selector. A switching control signal S is supplied to a control input terminal 50 of the three multiplexers 44, 46 and 48 from a switching circuit 16 (see FIG. 1).

When the video printing apparatus 1 is operated as the commercially-available color thermal transfer printer, the multiplexers 44, 46 and 48 connect the fixed input terminals 44b, 46b, 48b to common output terminals 44a, 46a, 48a in response to the switching control signal S supplied thereto from the terminal 50 so that the input terminal R' is connected to an output terminal R", the input terminal G' is connected to an output terminal G" and the input terminal B' is connected to an output terminal B", respectively, i.e., the same signal is parallelly distributed to the R memory 18, the G memory 20 and the B memory 22. When the video printing apparatus 1 is not provided with the distributor 14, if the input video signal is simultaneously supplied to the R, G, B input terminals 2, 4, 6 or the R, G, B input terminals 2, 4, 6 are short-circuited, then the same effect can be achieved.

When the commercially-available color thermal transfer printer is operated as the video printing apparatus 1 capable of outputting a monochrome video signal as a color image according to the present invention, the multiplexers 44, 46 and 48 connect the fixed input terminals 44c, 46c and 48c to the common output terminals 44a, 46a and 48a in response to the switching control signal S so that the input terminal G'

(signal is input only to the input terminal G') is connected to all of the three output terminals R", G" and B". The distributor 14 is operated as described above.

The digitized monochrome video signal B & W2 supplied to the distributor 14 is supplied by the distributor 14 to all the R memory 18, the G memory 20 and the B memory 22, respectively. In the stationary state, the R memory 18, the G memory 20 and the B memory 22 output the digitized monochrome video signals B & W2 from the data output terminals D0 through D7 directly.

The digitized monochrome video signals B & W2 are converted by a digital-to-analog (D/A) converter 24 to analog monochrome video signals and continuously monitored by the external display device 26 (in a black and white display fashion) if necessary. When the user wishes to print out images of two specific time points t1, t2 on a printing paper 42 as a color hard copy during monitoring, the user operates the switches 28, 30 and 32, such as fetch push buttons as follows.

In response to depression of the switch 28, the timing generator 34 outputs a fetch trigger signal from the output terminal 34r. This fetch trigger signal is supplied to the memory control terminal MC of the R memory 18. In response to depression of the switch 30, the timing generator 34 outputs a fetch trigger signal from the output terminal 34g. This fetch signal is supplied to the memory control terminal MC of the G memory 20. When the switch 22 is depressed, the timing generator 34 outputs a fetch trigger signal from the output terminal 34b. This fetch trigger signal is supplied to the memory control terminal MC of the B memory 22.

Initially, at time point t1, the switches 30 and 32 are depressed simultaneously (or the switches 30, 32 may be modified as a single switch). When the switches 30, 32 are depressed simultaneously, the timing generator 34 which acts as a timing generator for specifying a time point at which image data is stored generates and supplies the fetch trigger signals from the output terminals 34g, 34b to the memory control terminals MC of the G memory 20 and the B memory 22, whereby image data of one frame at the time point t1 is stored in the G memory 20 and the B memory 22 as image data (t1).

At the next time point t2, the switch 28 is depressed. In response to depression of the switch 28, the timing generator 34 generates and supplies the fetch trigger signal from the output terminal 34r to the memory control terminal MC of the R memory 18, whereby image data of one frame at the time point t2 is stored in the R memory 18 as image data (t2).

Figure 3:
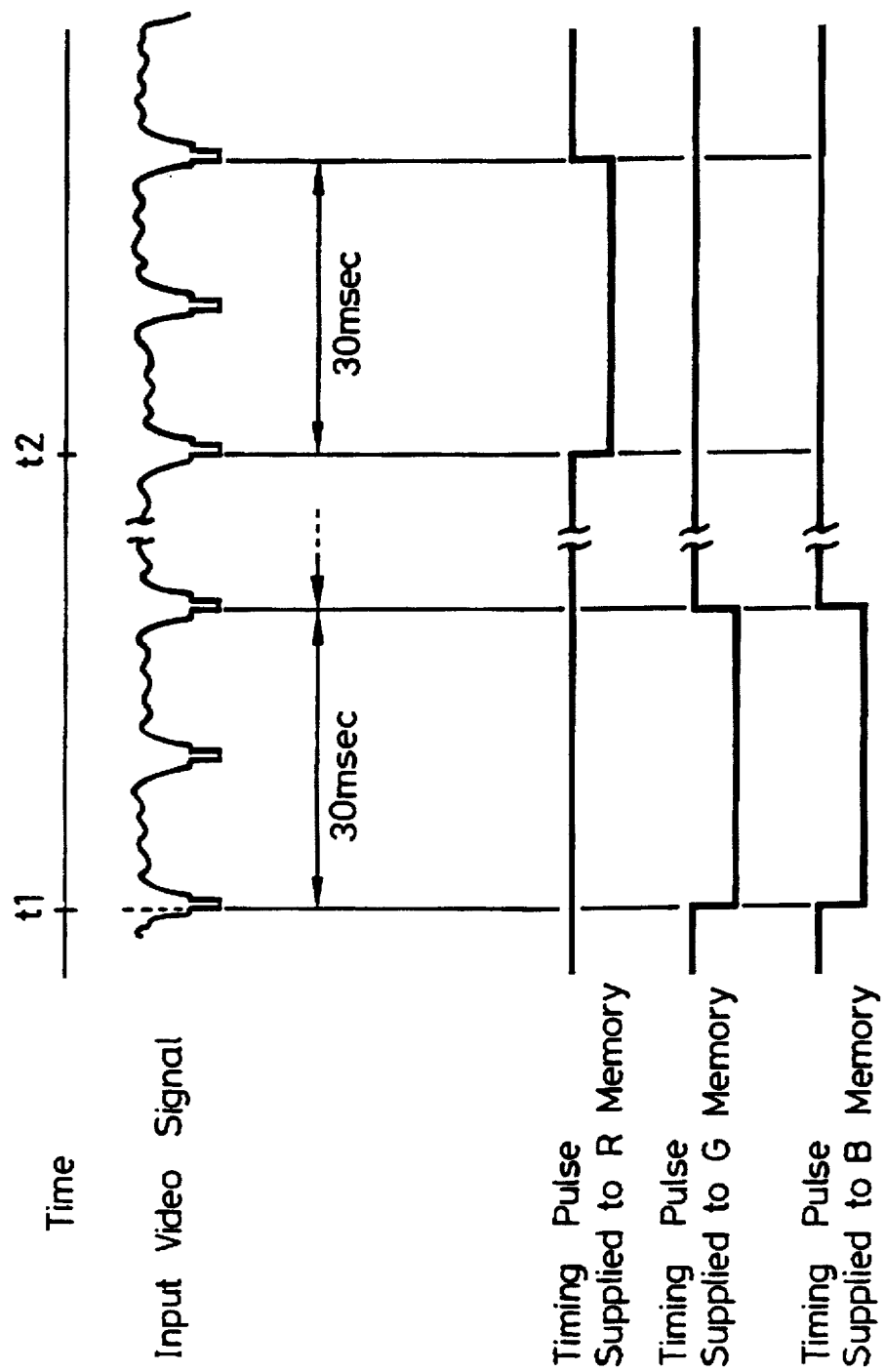
FIG. 3 is a timing chart showing a timing at which image data is supplied to memories of the video printer according to the present invention.

FIG. 3 is a timing chart used to explain action of the video printing apparatus 1.

An analog video signal (monochrome video signal) input to the G input terminal is illustrated on the topmost portion of the timing chart of FIG. 3. At the time point t1, image data of one frame (t1) is stored in the G memory 20 and the B memory 22. Thereafter, at the next time point t2, image data of one frame (t2) is stored in the R memory 18.

Upon printing, the head controller 36 transforms the image data (t1) stored in the G memory 20 to image data of magenta which is a complementary color of green. Then, the head controller 36 transforms the image data (t1) stored in the B memory 22 to image data of yellow which is a complementary color of blue by some suitable means, such as a ROM (read-only memory) or the like. This processing is called masking. The image data of magenta and the image data of yellow are printed with the same density on the printing paper 42 by the thermal print head 38, thereby causing an image of mixed color of magenta and yellow, that is, a red image to be printed out on the printing paper 42.

Further, the head controller 36 transforms the image data (t2) stored in the R memory 18 to image data of cyan which is a complementary color of red in a similar manner. Then, a cyan image is printed out on the printing paper 42 by the thermal print head 38.

The specific features of the present invention will be described below.

While the different color signals R2, G2 and B2 are respectively stored in the R memory 18, the G memory 20 and the B memory 22 in the commercially-available color thermal transfer printer, according to the present invention, the same monochrome video signals (these monochrome video signals are not always agreed from a timing standpoint) are stored in the R memory 18, the G memory 20 and the B memory 22.

Further, while the color signals R2, G2 and B2 concerning image data (t) of the same time point are respectively stored in the R memory 18, the G memory 20 and the B memory 22 in the commercially-available color thermal transfer printer, according to the present invention, the monochrome video signals at arbitrary and different time points, e.g., time points t1, t2 are stored in the R memory 18, the G memory 20 and the B memory 22.

A typical application example of the present invention will be described below briefly.

As an X-ray medical check method of blood vessels in the field of medical image processing, there is known an angiography in which blood vessels are visualized by X-ray after a radiopaque substance has been injected for contrast. Pictures (e.g., bones, etc.) other than blood vessels in image data are removed by some suitable methods, such as a subtraction method or the like. While pictures of blood vessels are continuously recorded by a video camera and monitored, there are obtained a picture of an artery at time point (t1) at which the radiopaque substance reaches the artery and a picture of a vein at time point (t2) after the radiopaque substance has reached the vein. This is the conventional technology.

In the video printing apparatus 1 according to the present invention, video signals at different time points are input. Then, the picture of an artery is recorded in the G memory 20 and the B memory 22 as image data(t1) at time point t1 and the picture of a vein is recorded in the R memory 18 as image data (t2) at time point t2.

When these image data are printed out on the printing paper 42 by the thermal print head 38, the vein of the image data (t1) is expressed in red and the vein of the image data (t2) is expressed in blue (cyan in actual practice).

Figures 4, 4A:
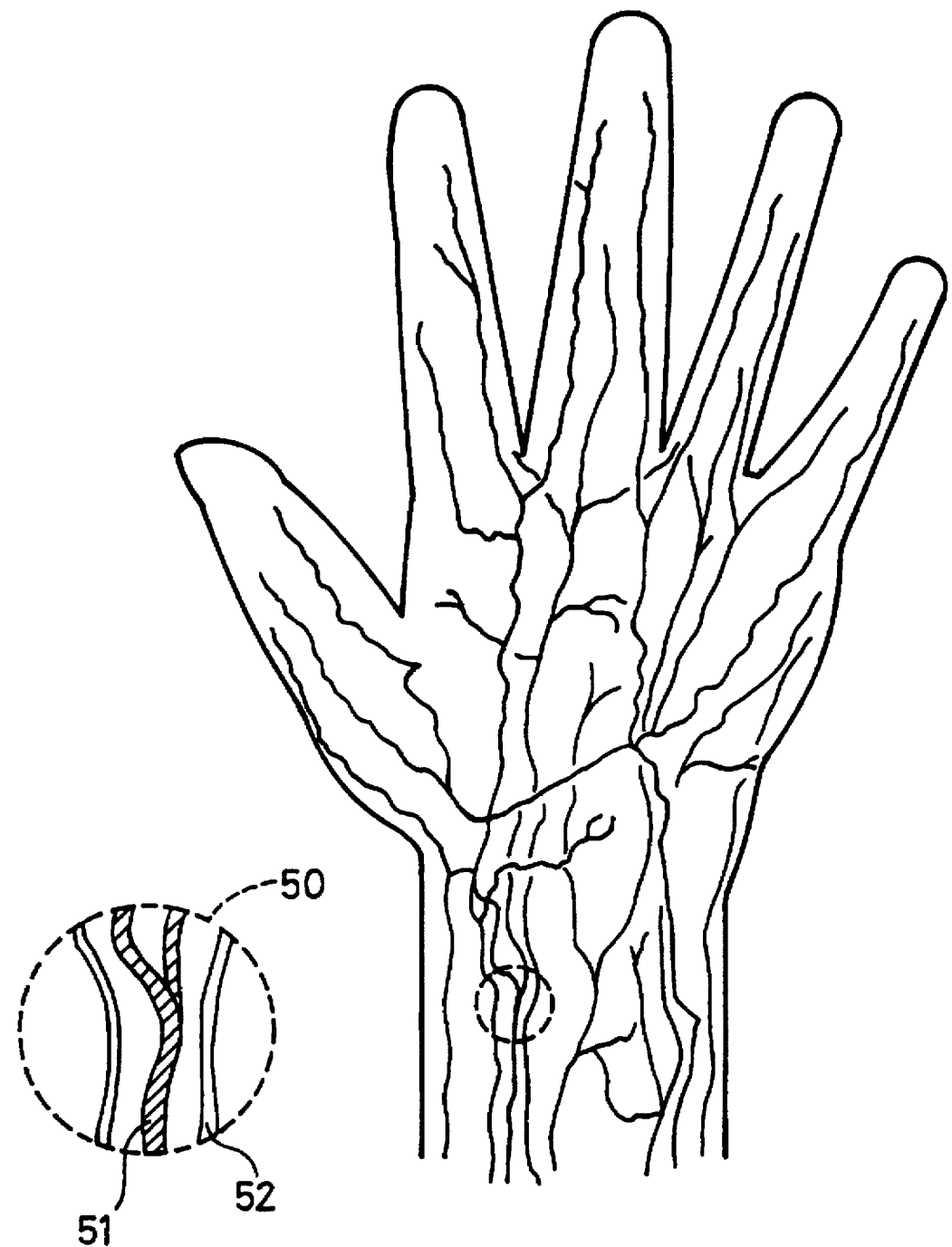
FIG. 4 is a pictorial representation schematically showing a printed-out result obtained when an X-ray photograph of blood vessels of a left hand is printed out on a printing paper by the video printer according to the present invention.

FIG. 4 is a pictorial representation schematically showing a picture of left hand as an example of a printed-out result. In FIG. 4, a small circle 50 is a fragmentary enlarged view of the picture of the left hand. In the circle 50, a vessel 51 shown hatched depicts an artery and other vessel 52 depicts a vein.

Figure 5:
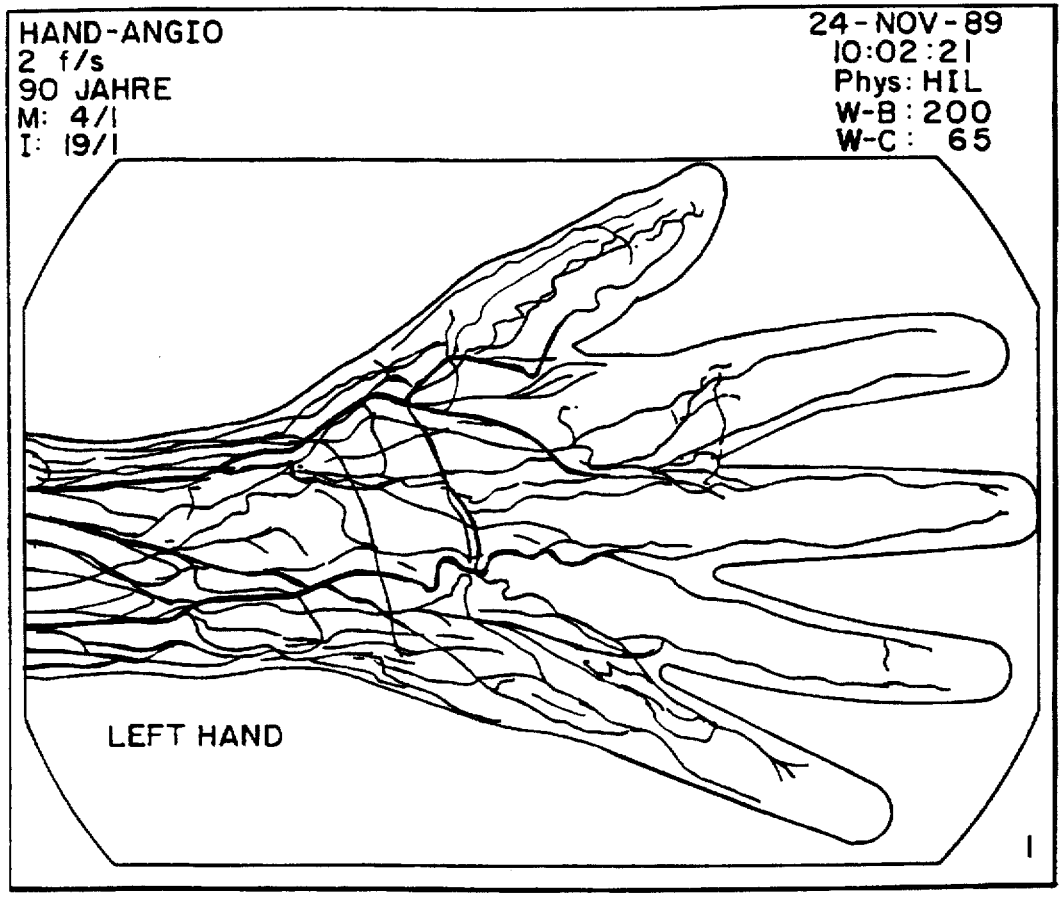
FIG. 5 shows an example of an angiography color photograph obtained when blood vessels of a left hand are visualized by X-ray and printed out by the video printer according to the present invention.

FIG. 5 shows a color picture of the printed-out result shown in FIG. 4.

According to the present invention, it is possible to print out image data of desired two time points or greater of the monochrome video signals as different color images.

Furthermore, according to the present invention, it is possible to output the monochrome video signal as the color image without modifying commercially-available apparatus and devices greatly.

Having described a preferred embodiment of the invention with reference to the accompanying drawings, it is to be understood that the invention is not limited to that precise embodiment and that various changes and modifications could be effected therein by one skilled in the art without departing from the spirit or scope of the invention as defined in the appended claims.

What is claimed is:

1. A video printing apparatus comprising:

trigger signal generating means for generating a first trigger signal and a second trigger signal having a timing different from that of said first trigger signal;

first memory means for storing an input video signal in response to said first trigger signal supplied thereto;

second memory means for storing an input video signal in response to said second trigger signal supplied thereto; and printing means for printing an image of a first color based on said video signal stored in said first memory means and printing an image of a second color different from said first color based on said video signal stored in said second memory means.

2. A video printing apparatus comprising:

first and second input means to which first and second video signals are supplied respectively;

first and second memory means for respectively storing said first and second video signals in response to respective trigger signals supplied thereto;

distributing means for supplying said first video signal supplied thereto from said first input means to said first memory means and said second video signal supplied thereto from said second input means to said second memory means in a first mode and supplying one of said first and second video signals supplied thereto from one of said first and second input means to said first and second memory means in a second mode;

timing generating means for supplying said trigger signals to said first and second memory means simultaneously in said first mode and supplying said trigger signals to said first and second memory means at arbitrary timings in said second mode; and printing means for printing an image of a first color based on said first video signal stored in said first memory means and printing an image of a second color based on said second video signal stored in said second memory means.

3. A video printing apparatus according to claim 2, wherein said first input means includes a first input terminal to which a red video signal is supplied in said first mode, said second input means includes a second input terminal to which a green video signal is supplied in said first mode and a third input means includes a third input terminal to which a blue video signal is supplied in said first mode, said first memory means includes a first memory for storing a video signal supplied thereto from said first input terminal, said second memory means includes a second memory for storing a video signal supplied thereto from said second input terminal and a third memory means includes a third memory for storing a video signal supplied thereto from said third input terminal, and said printing means includes transforming means for transforming said red, green and blue video signals read out from said first, second and third memories to yellow, cyan and magenta video signals in said first mode and a print head for printing an image based on said yellow, cyan and magenta video signals.

4. A method for printing a color image from a monochrome video signal comprising the steps of:

inputting said monochrome video signal;

storing said monochrome video signal in a first memory in response to a first trigger signal supplied thereto;

storing said monochrome video signal in a second memory in response to a second trigger signal supplied thereto;

printing the video signal stored in said first memory on a printing paper in a first color; and printing the video signal stored in said second memory on said printing paper in a second color different from said first color.

* * * * *